United States Patent
Hayashi et al.

(10) Patent No.: US 8,758,589 B2
(45) Date of Patent: Jun. 24, 2014

(54) ANTIREFLECTION FILM, OPTICAL ELEMENT COMPRISING ANTIREFLECTION FILM, STAMPER, PROCESS FOR PRODUCING STAMPER, AND PROCESS FOR PRODUCING ANTIREFLECTION FILM

(75) Inventors: Hidekazu Hayashi, Osaka (JP); Tokio Taguchi, Osaka (JP); Akiyoshi Fujii, Osaka (JP); Nobuaki Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 12/992,705

(22) PCT Filed: Jun. 4, 2009

(86) PCT No.: PCT/JP2009/002530
§ 371 (c)(1),
(2), (4) Date: Nov. 15, 2010

(87) PCT Pub. No.: WO2009/147858
PCT Pub. Date: Dec. 10, 2009

(65) Prior Publication Data
US 2011/0100827 A1   May 5, 2011

(30) Foreign Application Priority Data
Jun. 6, 2008  (JP) ................. 2008-149052

(51) Int. Cl.
*C25D 11/12* (2006.01)
*C25D 11/24* (2006.01)
*G02B 1/11* (2006.01)

(52) U.S. Cl.
USPC ............ 205/177; 205/70; 205/223; 205/229; 249/114.1; 359/601

(58) Field of Classification Search
USPC ........................................ 205/223, 229, 177
See application file for complete search history.

(56) References Cited

U.S. PATENT DOCUMENTS 4,310,586 A * 1/1982 Sheasby et al. ............... 428/220
4,737,447 A * 4/1988 Suzuki et al. ................. 430/321
(Continued)

FOREIGN PATENT DOCUMENTS

CN  1501100    6/2004
DE  10020877 C1  10/2001
(Continued)

OTHER PUBLICATIONS

R. B. C. Cayless "Alloy anad Temper Designation Systems for Aluminum and Aluminum Alloys", AMS Handbook, vol. 2, ASM International, 1990, pp. 15-20.*
(Continued)

*Primary Examiner* — James Lin
*Assistant Examiner* — William Leader
(74) *Attorney, Agent, or Firm* — Harness, Dickey & Pierce, P.L.C.

(57) ABSTRACT

An antireflection film of the present invention includes a plurality of first raised portions, each of which has a two-dimensional size of not less than 1 μm and less than 100 μm when seen in a direction normal to the film, and a plurality of second raised portions, each of which has a two-dimensional size of not less than 10 nm and less than 500 nm when seen in a direction normal to the film. In at least one embodiment, the antireflection film has a first surface shape or a second surface shape that is inverse to the first surface shape relative to a film surface. In the first surface shape, the second raised portions are provided on the first raised portions and between the plurality of first raised portions, and the elevation angle α of a surface of the first raised portions relative to the film surface is about 90° or more. The antireflection film of the present invention has a more excellent antiglare function than conventional ones.

3 Claims, 8 Drawing Sheets

(56) References Cited

U.S. PATENT DOCUMENTS

| | | | |
|---|---|---|---|
| 5,073,716 A * | 12/1991 | Clemens et al. | 250/492.2 |
| 5,597,984 A * | 1/1997 | Mohaupt | 177/210 C |
| 5,846,061 A * | 12/1998 | Ledebuhr et al. | 417/477.9 |
| 6,359,735 B1 | 3/2002 | Gombert et al. | |
| 6,695,987 B2 * | 2/2004 | Katsumura et al. | 264/1.33 |
| 6,837,096 B2 * | 1/2005 | Stewart | 73/23.35 |
| 7,066,234 B2 | 6/2006 | Sawitowski | |
| 7,835,080 B2 * | 11/2010 | Taguchi et al. | 359/574 |
| 2004/0091642 A1 | 5/2004 | Murakami et al. | |
| 2004/0248664 A1 * | 12/2004 | Billings | 473/300 |
| 2007/0159698 A1 | 7/2007 | Taguchi et al. | |
| 2009/0211912 A1 | 8/2009 | Taguchi et al. | |
| 2009/0252825 A1 | 10/2009 | Taguchi et al. | |

FOREIGN PATENT DOCUMENTS

| | | |
|---|---|---|
| JP | 63-303714 A | 12/1988 |
| JP | 2007-156145 A | 6/2007 |
| WO | WO-2006059686 A1 | 6/2006 |

OTHER PUBLICATIONS

International Preliminary Report on Patentability and Written Opinion for international patent application No. PCT/JP2009/002530 dated Jan. 20, 2011.

Masuda et al., Proceedings (Lecture Notes) of the 52nd joint lecture meeting of applied physics related societies (2005 spring in Saitama University) 30p-ZR-9, p. 112.

* cited by examiner

ANTIREFLECTION FILM, OPTICAL ELEMENT COMPRISING ANTIREFLECTION FILM, STAMPER, PROCESS FOR PRODUCING STAMPER, AND PROCESS FOR PRODUCING ANTIREFLECTION FILM

TECHNICAL FIELD

The present invention relates to an antireflection film and an optical element which includes an antireflection film (including a display device). Also, the present invention relates to a stamper (or "mold"), a method of fabricating a stamper, and a method of fabricating an antireflection film.

BACKGROUND ART

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 3. The two-dimensional size of a raised portion of an uneven pattern which performs an antireflection function is not less than 10 nm and less than 500 nm.

This method utilizes the principles of a so-called motheye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The motheye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a motheye structure, using an anodized porous alumina which is obtained by means of anodization (or "anodic oxidation") of aluminum has been receiving attention (Patent Documents 2 and 3 and Non-patent Document 1).

Now, the anodized porous alumina which is obtained by means of anodization of aluminum is briefly described. Conventionally, a method of forming a porous structure by means of anodization has been receiving attention as a simple method for making nanometer-scale micropores (recessed portions) in the shape of a circular column in a regular arrangement. A base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina is expected to be applied to a wide variety of functional materials.

Figure 11:
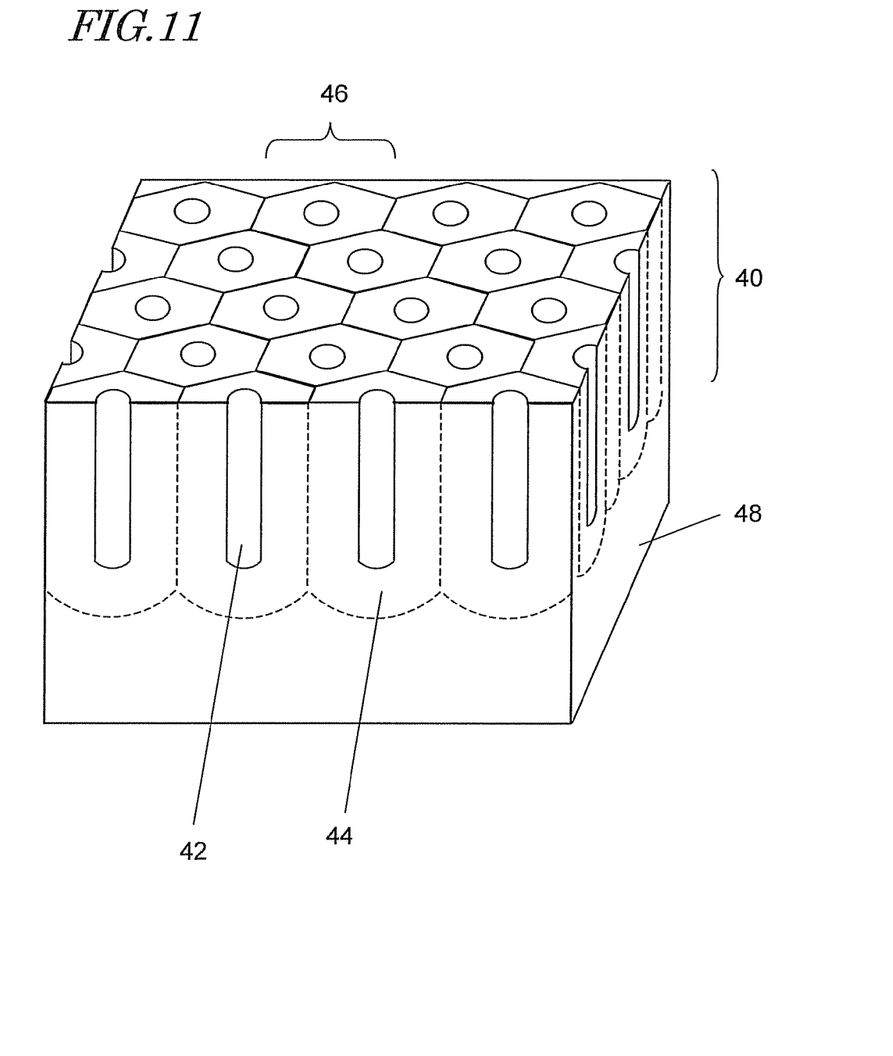
FIG. 11 A diagram schematically showing the structure of a porous alumina layer 40.

An anodized porous alumina layer 40 is constituted of cells 46 of equal sizes, each of which has a micropore 42 and a barrier layer 44, as schematically shown in FIG. 11. In the porous alumina layer 40 fabricated under specific conditions, the schematic shape of the cells 46 when seen in a direction perpendicular to the film surface is a generally regular hexagon. The cells 46 are in a two-dimensionally closest packed arrangement when seen in a direction perpendicular to the film surface. Each of the cells 46 has a micropore 42 at its center. The arrangement of the micropores 42 is periodic. The periodic arrangement of the micropores 42 herein means that, when seen in a direction perpendicular to the film surface, the sum of vectors extending from the geometric centroid (hereinafter, simply referred to as "centroid") of one micropore to the centroids of its neighboring micropores (vector sum) is zero. In the example shown in FIG. 11, 6 vectors extending from the centroid of one micropore 42 to the centroids of 6 neighboring micropores 42 have equal lengths, and the directions of the vectors are different by the angles of 60°. Thus, the sum of these vectors is zero. In an actual porous alumina layer, the micropores 42 are recognized as being periodic when the length of the sum of the vectors is less than 5% of the shortest one of the vectors.

The porous alumina layer 40 is formed by anodizing an aluminum surface and is therefore formed on an aluminum layer 48. The cells 46 are formed as a result of local dissolution and growth of a coating. The dissolution and growth of the coating concurrently advance at the bottom of the micropores which is referred to as a barrier layer 44. As known, the size of the cells 46, i.e., the interval between adjacent micropores 42, is approximately twice the thickness of the barrier layer 44, and is approximately proportional to the voltage that is applied during the anodization. It is also known that the diameter of the micropores 42 depends on the type, concentration, temperature, etc., of the electrolytic solution but is, usually, about ⅓ of the size of the cells 46 (the length of the longest diagonal of the cell 46 when seen in a direction vertical to the film surface). Such micropores 42 of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) by a transfer method with the use of a stamper which has an anodized alumina film over its surface.

Recently, Non-patent Document 1 disclosed that pieces of anodized alumina having various shapes were fabricated by repeating anodization of aluminum and a pore diameter increasing process. Non-patent Document 1 also disclosed that an alumina piece which had non-bellshape tapered micropores was used as a mold to fabricate an antireflection film of PMMA which had a motheye structure. The reflectance of this antireflection film is about 1% or less. The lateral surface of a recessed portion formed in an alumina layer described in Non-patent Document 1 is smooth (continuous) and linear.

The present applicant disclosed in Patent Document 3 that, by forming an antireflection film with the use of an alumina layer in which minute recessed portions have stepped lateral surfaces, the probability of reflection ($0^{th}$-order diffraction) of light can be reduced as compared with the case where the alumina layer described in Non-patent Document 1 was used.

Patent Document 3 also discloses that the stamper in which minute recessed portions have stepped lateral surfaces has a greater specific surface, and hence provides a greater surface treatment effect, than the stamper described in Non-patent Document 1. For example, the surface of the stamper may be subjected to a mold release treatment so that the transferability can be improved. Also, the surface of the antireflection film may be subjected to a water-repellent or oil-repellent treatment (e.g., fluoric treatment) so that a soil-release effect can be obtained.

As described in Patent Documents 1 to 3, by providing an uneven structure (macro structure) which is greater than a motheye structure (micro structure) in addition to the motheye structure, the antireflection film (antireflection surface) can be provided with an antiglare function. The size of a raised portion of the uneven structure which is capable of performing the antiglare function is not less than 1 μm and less than 100 μm. The entire disclosures of Patent Documents 1 to 3 are herein incorporated by reference.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: WO 2006/059686

Non-Patent Literature

Non-patent Document 1: Masuda et al., *Proceedings (Lecture Notes) of the 52nd joint lecture meeting of applied physics related societies* (2005 spring in Saitama University) 30p-ZR-9, p. 1112

SUMMARY OF INVENTION

Technical Problem

In the techniques described in Patent Documents 2 and 3, a stamper for formation of a motheye structure can easily be fabricated by means of anodization of aluminum. However, in order to provide an antiglare function, it is necessary to form a larger uneven structure than the motheye structure in an additional step by means of mechanical or chemical etching.

The present invention was conceived in order to solve the above problem. One of the major objects of the present invention is to provide a method of fabricating a stamper which is capable of forming an antireflection film (antireflection surface) that has an antiglare function by a simpler process than the conventional ones. Another one of the objects of the present invention is to provide an antireflection film with a more excellent antiglare function than those of the conventional antireflection films.

Solution to Problem

An antireflection film of the present invention has a first surface shape or a second surface shape that is inverse to the first surface shape relative to a film surface. The first surface shape includes a plurality of first raised portions, each of which has a two-dimensional size of not less than 1 μm and less than 100 μm when seen in a direction normal to the film, and a plurality of second raised portions, each of which has a two-dimensional size of not less than 10 nm and less than 500 nm when seen in a direction normal to the film. The plurality of second raised portions are provided on the plurality of first raised portions and between the plurality of first raised portions. An elevation angle of a surface of the plurality of first raised portions relative to the film surface is about 90° or more.

In one embodiment, the plurality of second raised portions include a raised portion having a generally conical shape.

In one embodiment, the plurality of second raised portions include irregularly-arranged raised portions. The plurality of first raised portions are in an irregular arrangement.

In one embodiment, the antireflection film is made of a photocurable resin.

In one embodiment, the haze value of the antireflection film is 8.5 or more.

An optical element of the present invention includes any of the above-described antireflection films.

A stamper of the present invention has a first surface shape or a second surface shape that is inverse to the first surface shape relative to a surface. The first surface shape includes a plurality of first raised portions, each of which has a two-dimensional size of not less than 1 μm and less than 100 μm when seen in a direction normal to the surface, and a plurality of second raised portions, each of which has a two-dimensional size of not less than 10 nm and less than 500 nm when seen in a direction normal to the surface. The plurality of second raised portions are provided on the plurality of first raised portions and between the plurality of first raised portions. An elevation angle of a surface of the plurality of first raised portions relative to the film surface being about 90° or more.

In one embodiment, the stamper includes an anodized alumina layer which has a surface shape that is substantially the same as the second surface shape.

A stamper fabrication method of the present invention is a method of fabricating the above-described stampers, including the steps of: (a) providing an Al base in which an Al content is 99.0 mass % or less; (b) partially anodizing the Al base to form a porous alumina layer having a plurality of minute recessed portions; and (c) bringing the porous alumina layer into contact with an alumina etchant to enlarge the plurality of minute recessed portions of the porous alumina layer.

In one embodiment, step (b) and step (c) are alternately performed two or more times to form a plurality of minute recessed portions in the porous alumina layer, each of the plurality of minute recessed portions having a stepped lateral surface.

In one embodiment, the Al base includes at least one element selected from the group consisting of Mn, Mg, and Fe. The total of these elements is preferably 1.0 mass % or more.

An antireflection film fabrication method of the present invention includes the steps of: providing any of the above-described stampers and a workpiece; and transferring the second surface shape to a surface of the workpiece using the stamper.

In one embodiment, the method includes the step of curing a photocurable resin interposed between the stamper and the surface of the workpiece, thereby forming a photocurable resin layer which has the transferred second surface shape over the surface of the workpiece.

Advantageous Effects of Invention

The present invention provides a method of fabricating a stamper which is capable of forming an antireflection film (antireflection surface) that has an antiglare function by a simpler process than the conventional ones. The present invention also provides an antireflection film with a more excellent antiglare function than those of the conventional antireflection films.

BRIEF DESCRIPTION OF DRAWINGS

FIG. 5 (a) is a SEM image of a surface of a stamper of the present invention. (b) is a SEM image of a surface of an antireflection film made of a photocurable resin.

DESCRIPTION OF EMBODIMENTS

Hereinafter, an antireflection film and a fabrication method thereof, and a stamper for use in fabrication of the antireflection film and a fabrication method thereof, according to the present invention, will be described with reference to the drawings.

Figure 1:
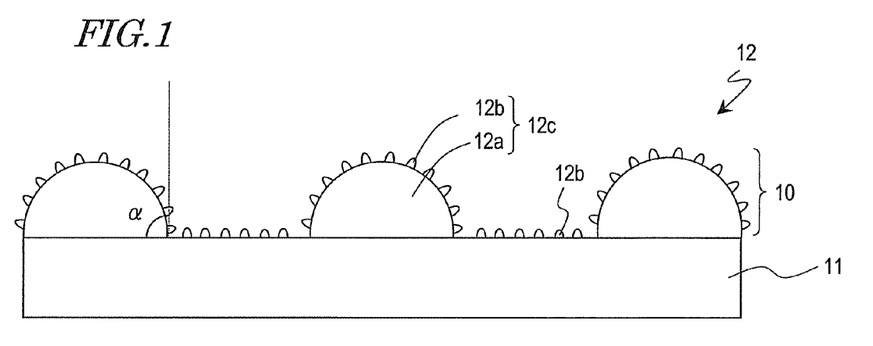
FIG. 1 A cross-sectional view schematically showing the structure of an antireflection film 10 formed over a surface of a base 11.

First, a structure of an antireflection film 10 according to an embodiment of the present invention is described with reference to FIG. 1. FIG. 1 is a cross-sectional view schematically showing the structure of the antireflection film 10 formed over a surface of a base 11. The base 11 may be a polymer film of, for example, TAC or PET. Alternatively, it may be a display panel of a liquid crystal display device or plasma display device. The base 11 may be of any material and may have any shape so long as antireflection is demanded.

The antireflection film 10 has a plurality of first raised portions 12a, each of which has a two-dimensional size of not less than 1 µm and less than 100 µm when seen in a direction normal to the film, and a plurality of second raised portions 12b, each of which has a two-dimensional size of not less than 10 nm and less than 500 nm when seen in a direction normal to the film. The height of each of the first raised portions 12a and the second raised portions 12b is substantially equal to its two-dimensional size. Note that the two-dimensional size is approximately represented by the diameter of a circle. The second raised portions 12b are provided on the first raised portions 12a and between the plurality of first raised portions 12a. A complex structure formed by a first raised portion 12a and second raised portions 12b formed on the first raised portion 12a is sometimes referred to as "double raised portion 12c". Also, a surface which has the first raised portions 12a and the second raised portions 12b is sometimes referred to as "antireflection surface 12". The first raised portions 12a provide an antiglare function, while the second raised portions 12b form a motheye structure which provides an antireflection function. A structure formed by the first raised portions 12a that provide the antiglare function is sometimes referred to as an antiglare structure. Specifically, the motheye structure is formed by the plurality of second raised portions 12b each having a two-dimensional size of not less than 10 nm and less than 500 nm. A structure which is formed by the plurality of first raised portions 12a each having a two-dimensional size of not less than 1 µm and less than 100 µm is referred to as an antiglare structure.

The antireflection film 10 or antireflection surface 12 according to an embodiment of the present invention is characterized in that the elevation angle of the surface of the first raised portions 12a relative to the film surface, α, is about 90° or more. Since α is 90° or more, the antireflection film 10 or antireflection surface 12 has more excellent antiglare characteristics (8.5 or more in haze value) than the conventional antiglare layer as will be described later. Note that the surface shape of the antireflection surface 12 shown in FIG. 1 may be inverted relative to the film surface, and in such a case, the equivalent effects can be obtained. The surface shape which is inverse to the surface shape of FIG. 1 can be formed by performing one additional transfer step which will be described later.

In the example shown herein, the second raised portions 12b provided between adjacent first raised portions 12a are independently formed on the surface of the base 11. However, the second raised portions 12b provided between the first raised portions 12a may be integrally formed with the underlying layer.

The antireflection layer 10 is preferably formed by forming a photocurable resin layer over the surface of the base 11 such that the surface shape of the stamper is transferred to the photocurable resin layer. Specifically, the photocurable resin layer is formed by curing a photocurable resin (e.g., acrylic resin) interposed between the stamper whose surface shape is inverse to the surface shape of the antireflection surface 12 and the base 11. In this case, if the force of pressing the stamper onto the surface of the base 11 is sufficiently large, the second raised portions 12b provided between adjacent first raised portions 12a are independently formed on the surface of the base 11 as shown in FIG. 1. If the force of pressing the stamper is small, the second raised portions 12b provided between adjacent first raised portions 12a are integrally formed with the underlying layer. The surface between adjacent first raised portions 12a may be a recessed surface depending on the surface shape of the stamper, rather than being flat as shown in the drawing.

The elevation angle α of the first raised portions 12a is preferably about 80° or more in terms of the antiglare characteristics. In terms of the mold releasability of the stamper in the transfer step, it is preferably about 130° or less. To prevent diffraction or the like, the plurality of first raised portions 12a are preferably in an irregular arrangement.

The second raised portions 12b which provide an antireflection function preferably include a raised portion having a generally conical shape. Preferably, the second raised portions 12b include irregularly-arranged raised portions. Here, the inclusion of irregularly-arranged raised portions covers a case where the arrangement of the second raised portions 12b is irregular across the entire surface of the antireflection film 10 as well as a case where the arrangement of the second raised portions 12b in part of the antireflection film is irregular. The irregular arrangement means an arrangement lacking periodicity. The raised portions preferably have a stepped lateral surface as described in Patent Document 3.

Next, a method of fabricating a stamper that is for formation of the antireflection film 10 is described with reference to FIG. 2. The stamper fabrication method of the present embodiment is based on a new knowledge experimentally derived by the present inventor that the surface shape of an alumina layer formed by anodization varies depending on the purity of the Al base and the type of an impurity element. This knowledge will be described later with experiment examples.

Figure 2:
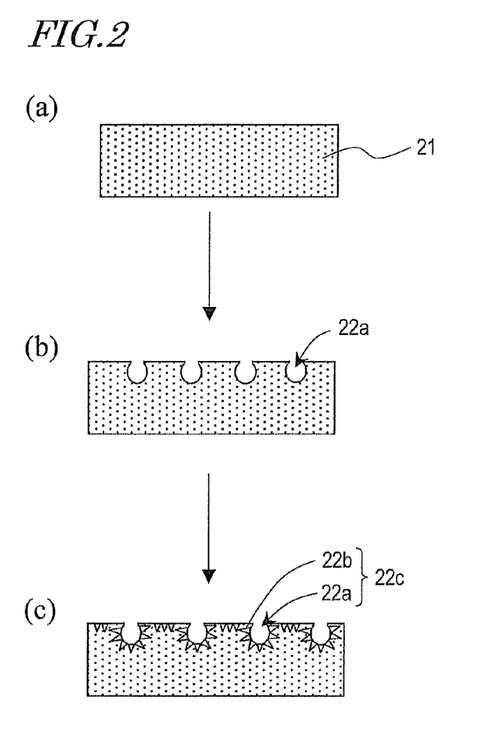
FIG. 2 (a) to (c) are schematic diagrams illustrating a method of fabricating a stamper that is for formation of the antireflection film 10.

First, as shown in FIG. 2(a), an Al base 21 is provided in which the Al content is 99.0 mass % or less. Here, the Al base 21 preferably includes at least one element selected from the group consisting of Mn, Mg, and Fe. The total content of these elements is preferably 1 mass % or more. Note that the Al base 21 may further include Si.

Then, as shown in FIG. 2(b), part of (surface part of) the Al base 21 is anodized to form a porous alumina layer which has a plurality of minute recessed portions. Then, the porous alumina layer is brought into contact with an alumina etchant to enlarge the plurality of minute recessed portions of the porous alumina layer, whereby recessed portions 22a are formed. The recessed portions 22a are formed when the Al base 21 is 99.0 mass % or less, especially when the Al base 21 contains at least one element selected from the group consisting of Mn, Mg, and Fe. When the Al purity of the Al base exceeds 99.0 mass %, the number of the recessed portions 22a decreases. When the Al purity exceeds 99.5 mass %, the number of the recessed portions 22a further decreases. Note that the recessed portions 22a are formed in the first etching step of the porous alumina layer, and in the two or more subsequent etching steps, the number and size of the recessed portions 22a scarcely change. The distribution of the recessed portions 22a is irregular.

Thereafter, the above-described anodization step and etching step are alternately performed two or more times such that a plurality of minute recessed portions 22b, each of which has a stepped lateral surface, are formed in the porous alumina layer. The minute recessed portions 22b are formed across the entire surface of the Al base 21, including the inner surface of the recessed portions 22a.

In the example described herein, the minute recessed portions 22b are formed by the method described in Patent Document 3, to which the present invention is not limited. The above-described method utilizes a property of anodized porous alumina that, if anodization is once stopped halfway and then restarted in the same conditions, the point of the restart is at the bottom of a recessed portion (micropore) that has been formed before the pause, and another recessed portion of the same cell size and the same pore diameter is formed at the same position.

Hereinafter, the method for forming the minute recessed portions 22b each having a stepped lateral surface is described with reference to FIG. 3.

Figure 3:
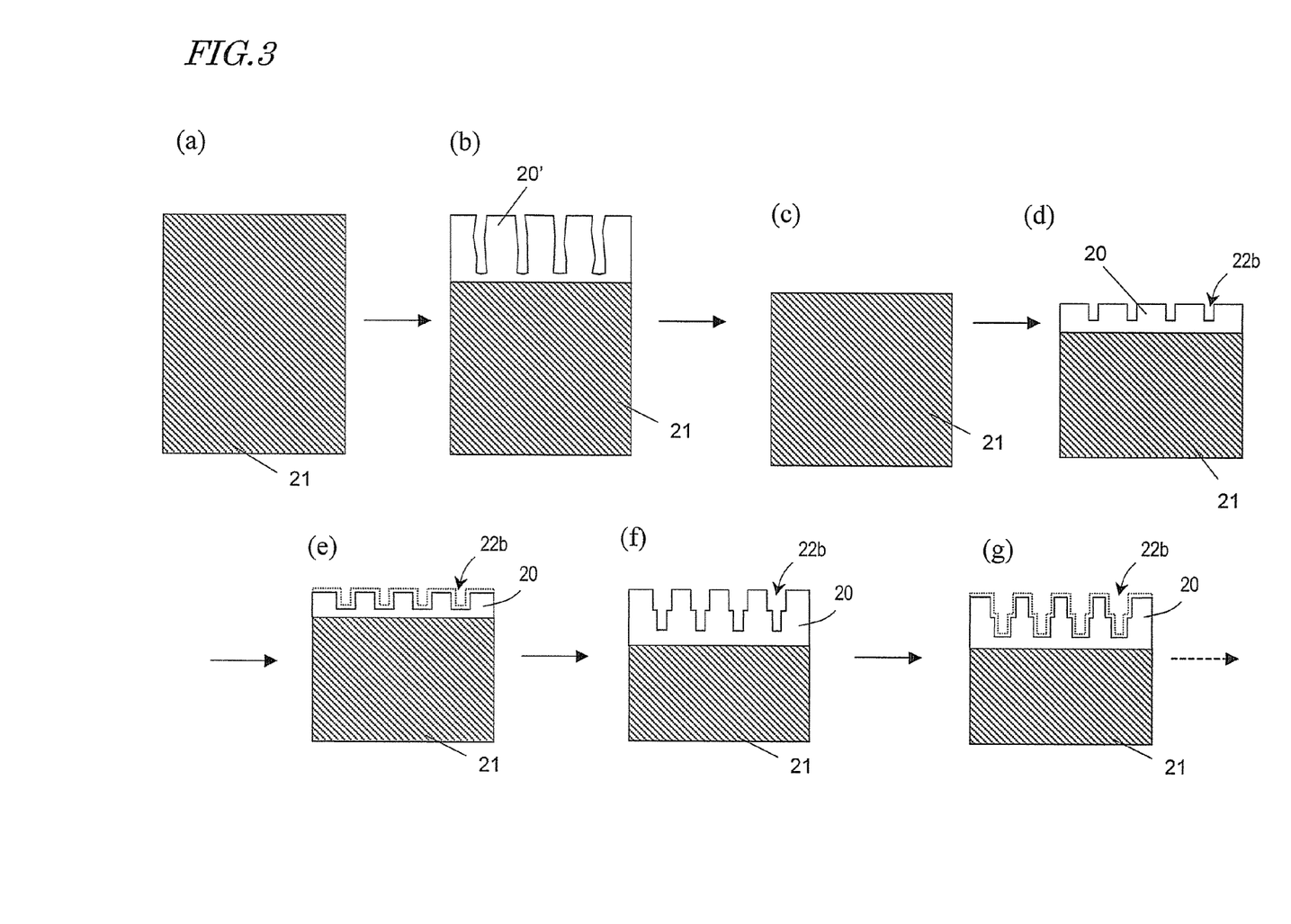
FIG. 3 (a) to (g) are schematic cross-sectional views illustrating a method of fabricating a stamper according to an embodiment of the present invention.

First, as shown in FIG. 3(a), the Al base 21 which has the recessed portions 22a is provided. Here, the recessed portions 22a are not shown for the sake of simplicity.

Then, part of (surface part of) this Al base 21 is anodized under predetermined conditions to form a porous alumina layer 20' as shown in FIG. 3(b). The size of the recessed portions 22b, the formation density, the depth of the recessed portions 22b, etc., can be controlled by changing the anodization conditions (for example, the forming voltage, the type and concentration of the electrolytic solution, as well as the duration of anodization). Also, the regularity of arrangement of the recessed portions 22b can be controlled by controlling the level of the forming voltage. For example, the conditions for obtaining an arrangement with high regularity are: (1) using an appropriate constant voltage inherent to the electrolytic solution in the anodization; and (2) conducting the anodization for a long time period. Known combinations of the electrolytic solution and the forming voltage which meet the above conditions are 28 V for sulfuric acid, 40 V for oxalic acid, and 195 V for phosphoric acid. To form the recessed portions 22b in an irregular arrangement, the etching step and the anodization step for the porous alumina layer are alternately repeated under the above condition (1) while the duration of the anodization is however decreased as short as possible.

In the porous alumina layer 20' formed in the initial steps, the recessed portions 22b have a tendency to have a disturbance in their arrangement. Thus, in consideration of reproducibility, the initially-formed porous alumina layer 20' is preferably removed as shown in FIG. 3(c). The thickness of the porous alumina layer 20' is preferably 200 nm or more in view of reproducibility and is preferably 2,000 nm or less in view of productivity.

As a matter of course, when necessary, the steps (e) to (g) described below may be carried out without removing the porous alumina layer 20'. The porous alumina layer 20' may be removed partially (e.g., from the surface to a certain depth), although in the example illustrated in FIG. 3(c) the porous alumina layer 20' is totally removed. The removal of the porous alumina layer 20' may be carried out using a known method. For example, the structure is immersed in a phosphoric acid aqueous solution or chromium-phosphoric acid mixture solution for a predetermined time period such that the layer 20' is removed.

Thereafter, the anodization is carried out again to form a porous alumina layer 20 which have the recessed portions 22b as shown in FIG. 3(d). The size of the recessed portions 22b, the formation density, the depth of the recessed portions 22b, the regularity of arrangement, etc., are controlled by controlling the conditions and duration of the anodization.

Then, the porous alumina layer 20 which have the recessed portions 22b is brought into contact with an alumina etchant to etch away a predetermined amount, such that the pore diameter of the recessed portions 22b is increased as shown in FIG. 3(e). Employing wet etching in this step enables generally isotropic expansion of the wall of the recessed portions 22b and the barrier layer. The etching amount (i.e., the size and depth of the recessed portions 22b) can be controlled by adjusting the type and concentration of the etchant and the etching duration. For example, the structure is immersed in a phosphoric acid aqueous solution or chromium-phosphoric acid mixture solution for a predetermined time period for removal.

Thereafter, the Al base 21 is partially anodized again such that the recessed portions 22b grown in the depth direction and the thickness of the porous alumina layer 20 increases as shown in FIG. 3(f). Here, the growth of the recessed portions 22b starts at the bottom of the previously-formed recessed portions 22b, so that the lateral surface of the recessed portions 22b has a stepped shape.

Thereafter, the porous alumina layer 20 is brought into contact with an alumina etchant for additional etching such that the pore diameter of the recessed portions 22b is further increased as shown in FIG. 3(g).

By repeating the above-described anodization step (FIG. 3(d)) and the above-described etching step (FIG. 3(e)), the porous alumina layer 20 provided with the recessed portions 22b which has a desired uneven shape is obtained. By appropriately determining the conditions of the respective one of the anodization step and the etching step, the size of the recessed portions 22b, the formation density, and the depth of the recessed portions 22b, as well as the stepped shape of the lateral surface of the recessed portions 22b, can be controlled. To decrease the area of the bottom of the recessed portions 22b, the process is preferably finished with the anodization step (with no etching step performed thereafter).

In the example described herein, the anodization step and the etching step are alternately performed. However, between the anodization step and the etching step, or between the etching step and the anodization step, a washing step and a drying step subsequent thereto may be performed.

Preferably, the arrangement of the recessed portions 22b does not have periodicity (i.e., being irregular) with the view of preventing occurrence of diffraction of light. The non-periodic arrangement means that the sum of vectors extending from the centroid of one recessed portion 22b to the centroids of its neighboring recessed portions 22b (vector sum) is 5% or more of the shortest one of the vectors. In this case, the arrangement of the recessed portions 22b is recognized as being substantially non-periodic. When the uneven structure has a periodicity, the period of the structure is preferably smaller than the wavelength of light. The interval between adjacent recessed portions (the interval between adjacent raised portions in the antireflection film) is preferably within the range of not less than 100 nm and not more than 200 nm with the view of preventing diffraction in the entire wavelength band of visible light (380 nm to 780 nm).

Therefore, the stamper for fabrication of the antireflection film may be fabricated by forming a shape that is inverse to a desired uneven shape of a high antireflection characteristic in which the above factors contributing to the antireflection characteristic are respectively controlled, or by forming the desired uneven shape itself, over the base.

The stamper as fabricated in the above-described procedure can be used in mass production without any modification. As a matter of course, when necessary, a metal stamper (e.g., Ni stamper) which has an uneven surface structure transferred from the above-described alumina layer may be fabricated using an electroforming method, and the resultant stamper may be used to fabricate an antireflection film by a transfer method. However, this process would entail a higher cost. Using anodization advantageously enables a stamper which is suitable to manufacture of an antireflection film to be fabricated through a convenient process. Also, the stamper as fabricated can advantageously be used in mass production without any modification. The stamper fabrication method of the present invention can also be suitably used for fabrication of a stamper which has a large surface or a special form (e.g., in the form of a roll).

Note that, in the stamper of the embodiment of the present invention, the minute recessed portions have stepped lateral surfaces. Therefore, the specific surface is large, and as a result, the effect of the surface treatment is strongly obtained. For example, a mold release treatment given to the surface of the stamper will improve the transferability. A water-repellent or oil-repellent treatment (e.g., fluoric treatment) given to the surface of an antireflection element will provide the soil-release effect. In the antireflection element manufactured using this stamper, minute raised portions have stepped lateral surfaces. Therefore, advantageously, this antireflection element is less likely to cause reflection ($0^{th}$-order diffraction) of light than an antireflection element which has the same pitch and the same height.

Next, an example of the shape of the recessed portions 22b is described with reference to FIG. 4. By repeating the step of performing micropore formation in the depth direction (arrow A1) by means of anodization (FIG. 3(d)) and the step of increasing the pore diameter in the in-plane direction of the alumina layer (arrow A2) by means of etching (FIG. 3(e)) under the same conditions in the respective steps, the resultant recessed portions 22b have a stepped cross section which is formed by repetition of a constant step height (corresponding to 3 squares) and a constant step width (corresponding to 1 square) as shown in FIGS. 4(a) and 4(b). By repeating the anodization step and the etching step many times with short intervals, the recessed portions 22b having a generally conical shape can be obtained as shown. In the example described herein, the process is finished with the anodization step so that the area of the bottom of the recessed portions 22b can be decreased. Specifically, the deepest part of the recessed portion 22b substantially has a pointed end.

When this method is used, the aforementioned factors that are important in improving the antireflection characteristic can be readily controlled. The period of the recessed and raised portions of the uneven structure, i.e., the interval of the recessed portions 22b, which determines whether or not unwanted diffraction occurs, can be controlled by controlling the forming voltage that is applied during the anodization. Alternatively, occurrence of unwanted diffraction can be prevented by employing such forming conditions that disturb the periodicity of the recessed portions 22b (conditions which do not meet the aforementioned conditions that realize a high periodicity film). The depth of the uneven structure (aspect ratio) can be controlled by controlling the micropore formation amount for the anodization and the etching amount.

Figure 4:
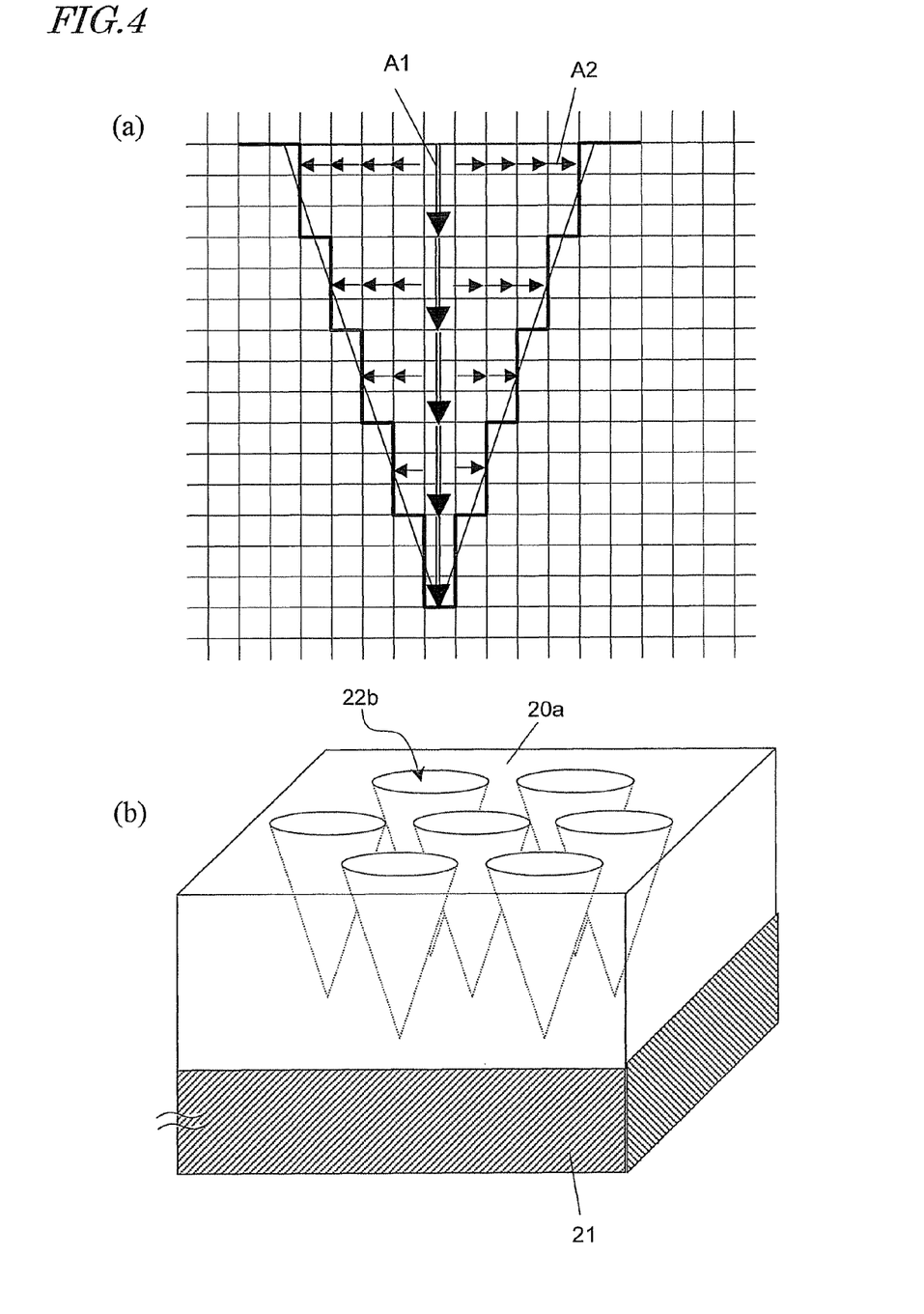
FIGS. 4 (a) and (b) are schematic diagrams showing the shape of recessed portions 22b of a porous alumina layer 20a obtained by a stamper fabrication method according to the embodiment of the present invention.

For example, when the recessed portion formation amount (depth) is greater than the etching amount (opening size) as shown in FIG. 4, the resultant uneven structure has a high aspect ratio. The height (depth) of the uneven structure of the antireflection element is important in improving the antireflection function. In the case of the recessed portions 22b which have the above-described stepped lateral surface, when the size of the step (step height and width) is smaller than the wavelength, diffraction (reflection) of light is less likely to occur than in the antireflection element having the same pitch, even if the arrangement of the recessed portions 22b is periodic.

Figure 5:
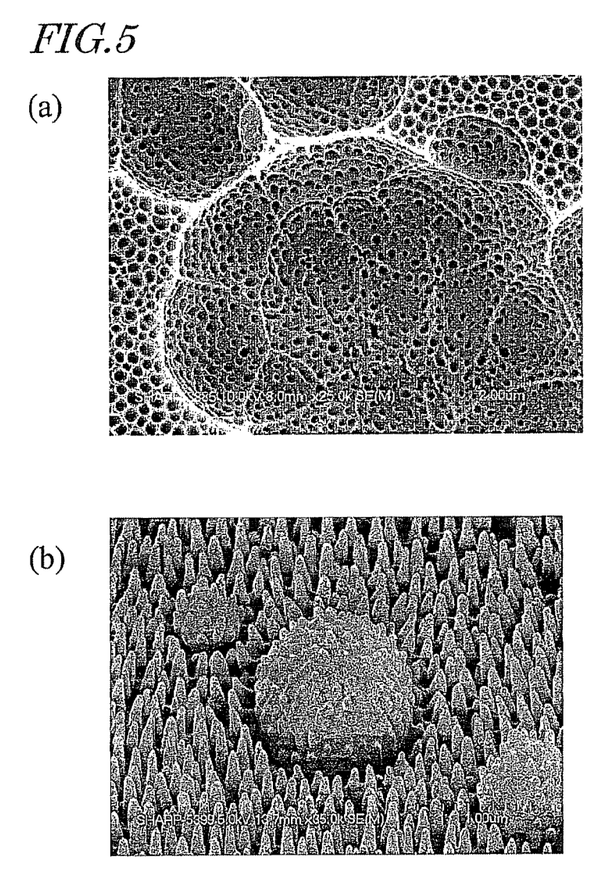

FIG. 5(a) shows a SEM image of a surface of the stamper fabricate by the above-described method. FIG. 5(b) shows a SEM image of the surface of an antireflection film which was formed of a photocurable resin using the stamper fabricate by the above-described method.

In the stamper shown in FIG. 5(a), the Al base 21 was made of an Al material in which the Al content was 99.0 mass % or less. Specifically, an Al material containing Si of 0.6 mass %, Fe of 0.7 mass %, and Mn of 1.5 mass % (Al content: 97.2 mass %, the total of Fe and Mn was 2.2 mass %) was used. The size of the base 21 was a cube with sides of 100 mm.

The fabrication process of the stamper consisted of two cycles of (anodization→preliminary etching)+ (anodization→etching), which were followed by another anodization at the end of the process. The process of (anodization→preliminary etching) formed the recessed portions 22a, and the subsequent process formed the recessed portions 22b. The conditions for the anodization, the preliminary etching, and the etching are shown below:

Electrode-Sample Distance: 150 mm (electrode: Pt plate)
Anodization Conditions:
    treatment solution: oxalic acid (0.05 mol/L)
    treatment temperature: 3° C.
    voltage: 80 V
    duration: 1 min.
Preliminary Etching Conditions:
    treatment solution: phosphoric acid (8 mol/L)
    treatment temperature: 30° C.
    duration: 90 min.
Etching Conditions:
    treatment solution: phosphoric acid (8 mol/L)
    treatment temperature: 30° C.
    duration: 20 min.

As seen from FIG. 5(a), the surface has a large number of recessed portions 22a of several micrometers. In some parts of the surface, plural ones of the recessed portions 22a together form a larger recessed portion of 10 µm to several tens of micrometers. Also, the entire surface, including the inner surfaces of the recessed portions 22a, is provided with a large number of minute recessed portions 22b. The distribution of the recessed portions 22a and the recessed portions 22b is irregular.

As a result of transfer of the surface shape of the stamper which is formed by the recessed portions 22a and the recessed portions 22b, the antireflection film of a photocurable resin shown in FIG. 5(b) has a plurality of first raised portions 12a, each having a two-dimensional size of not less than 1 µm and less than 100 µm, and a plurality of second raised portions 12b, each having a two-dimensional size of not less than 10 nm and less than 500 nm, as schematically shown in FIG. 1. The arrangement of the first raised portions 12a and the second raised portions 12b is irregular. A unique structure is clearly seen in which the elevation angle of the surface of the first raised portions 12a relative to the film surface is about 90° or more.

Note that, herein, a PET film (100 µm thick) was used as the base 11 shown in FIG. 1. The surface of the stamper formed of anodized alumina was subjected to a mold release treatment (water-repellent or oil-repellent treatment) with the use of a fluoric mold releasing agent. A UV-curable resin (acrylic resin) of an appropriate amount was supplied from a syringe on a PET film, and the film was combined with the stamper using a laminator. Thereafter, the laminate was irradiated with ultraviolet rays (365 nm, 1,000 mW/cm$^2$) for two minutes so that the UV-curable resin was cured. Then, the stamper was peeled away. In this way, the antireflection film 10 was formed over the surface of the PET film 11 as schematically shown in FIG. 1.

Figure 6:
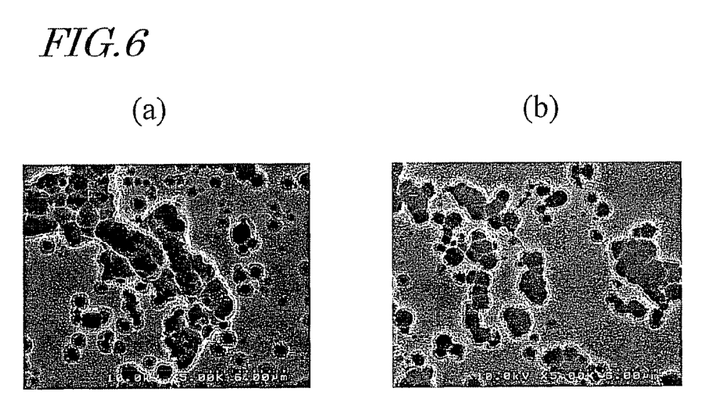
FIGS. 6 (a) and (b) are SEM images of a surface of an Al base with the Al content of 99.0 mass % or less which was subjected to the anodization and then the preliminary etching.
Figure 7:
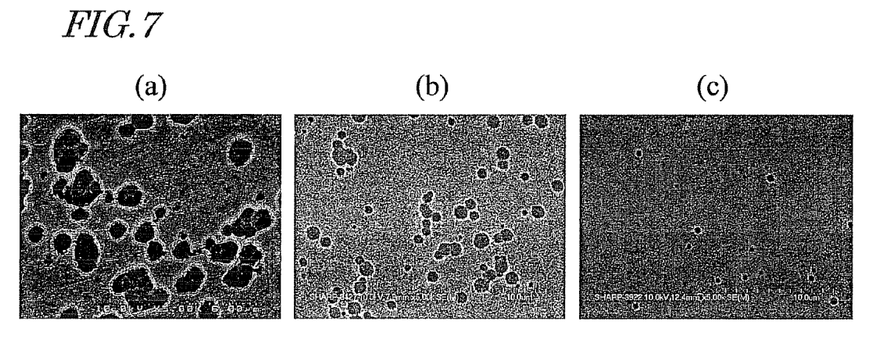
FIGS. 7 (a), (b), and (c) are SEM images of a surface of an Al base with the Al content of more than 99.0 mass % which was subjected to the anodization and then the preliminary etching.

The present inventor experimentally found that the recessed portions 22a, which are for formation of the first raised portions 12a, largely depend on the impurities contained in the Al base 21. Some parts of the results are now described with reference to FIG. 6 and FIG. 7. FIGS. 6(a) and 6(b) are SEM images of the surface of an Al base with the Al content of 99.0 mass % or less which was subjected to the anodization and then the preliminary etching. FIGS. 7(a), 7(b), and 7(c) are SEM images of the surface of an Al base with the Al content of more than 99.0 mass % which was subjected to the anodization and then the preliminary etching.

FIG. 6(a) is a SEM image of the same surface as that shown in FIG. 5(a) which was however observed at a lower magnification. FIG. 6(b) shows an example where an Al material containing Si of 0.6 mass %, Fe of 0.35 mass % and Mg of 0.9 mass % (Al content: 98.15 mass %, the total of Fe and Mg was 1.25 mass %) was used. It is understood that, even when an Al material which contains Mg as an impurity element is used, there are many recessed portions 22a each having a two-dimensional size of not less than 1 µm and less than 100 µm generally as well as in the case where Mn is contained as the impurity element.

On the other hand, the Al materials shown in FIGS. 7(a) to 7(c) are high-purity Al materials in which the Al content is 99.5 mass %, 99.85 mass %, and 99.999 mass %, respectively, and in which the impurities contained were Si and Fe. As apparent from the drawings, the number of recessed portions 22a decreases as the purity of Al increases. In this way, by modifying the aluminum purity and the impurity element type of the Al base that is subjected to the anodization, the recessed portions 22a that are configured to form raised portions 12a which provide an antiglare function can be formed through substantially the same process as that of the recessed portions 22b that are configured to form raised portions 12b which constitute a motheye structure.

The above-described Al materials were used to fabricate stampers. The stampers were used to form antireflection films of a UV-curable resin by the same method as described above. The resultant antireflection films were evaluated in terms of the haze value. In the case shown in FIG. 5(a) and FIG. 6(a) where the Al material which contained Mn and in which the Al content was 99.0 mass % or less was used, the haze value was 8.75. In the case shown in FIG. 7(a) where the Al base in which the Al content was 99.5 mass % and which did not contain Mn or Mg was used, the haze value was as low as 3.13. In the case where the Al base in which the Al content was 99.5 mass % and which contained Mn was used, the haze value was 6.65. When Mn was contained, a larger number of recessed portions 22a were formed even when the Al content was the same, i.e., 99.5 mass %. However, this sample could not achieve a haze value of 8.5 or more. Note that, as a result of a subjective evaluation of the present inventor, it was found that the internal reflection of the display panel can be sufficiently prevented so long as the haze value is 8.5 or more.

Figure 8:
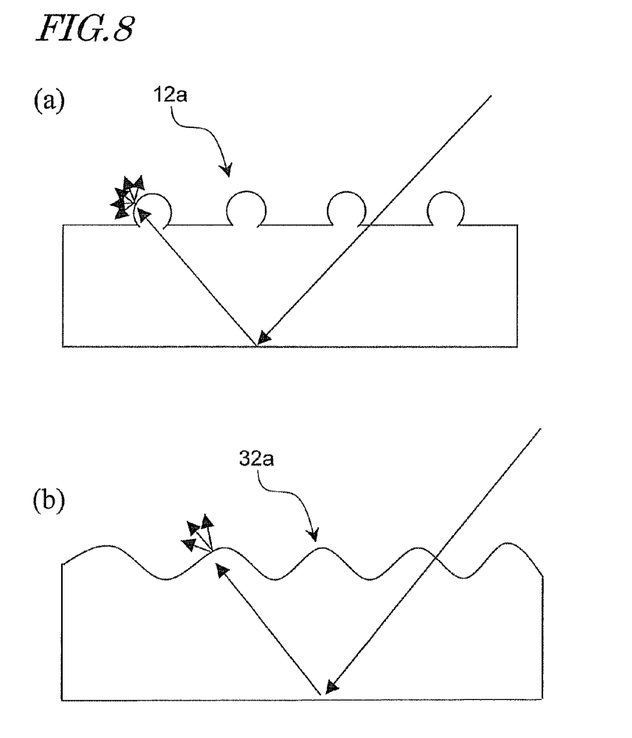
FIGS. 8 (a) and (b) are schematic diagrams illustrating the difference in scattering effect which depends on the shape of raised portions of an antireflection film.

The antiglare function of the antireflection film is important in preventing internal reflection in the display panel. As schematically shown in FIG. 8(a), the above-described raised portions 12a can efficiently scatter light which is reflected inside the display panel and outgoes toward the viewer side. Thus, a relatively high haze value can be obtained. On the other hand, as schematically shown in FIG. 8(b), raised portions 32a of the surface of a conventional antiglare layer have moderate elevation angles, and therefore, their function of scattering internal reflection is small.

This was verified using a light ray tracking simulation. The models used herein are shown in FIGS. 9(a) and 9(b).

Figure 9:
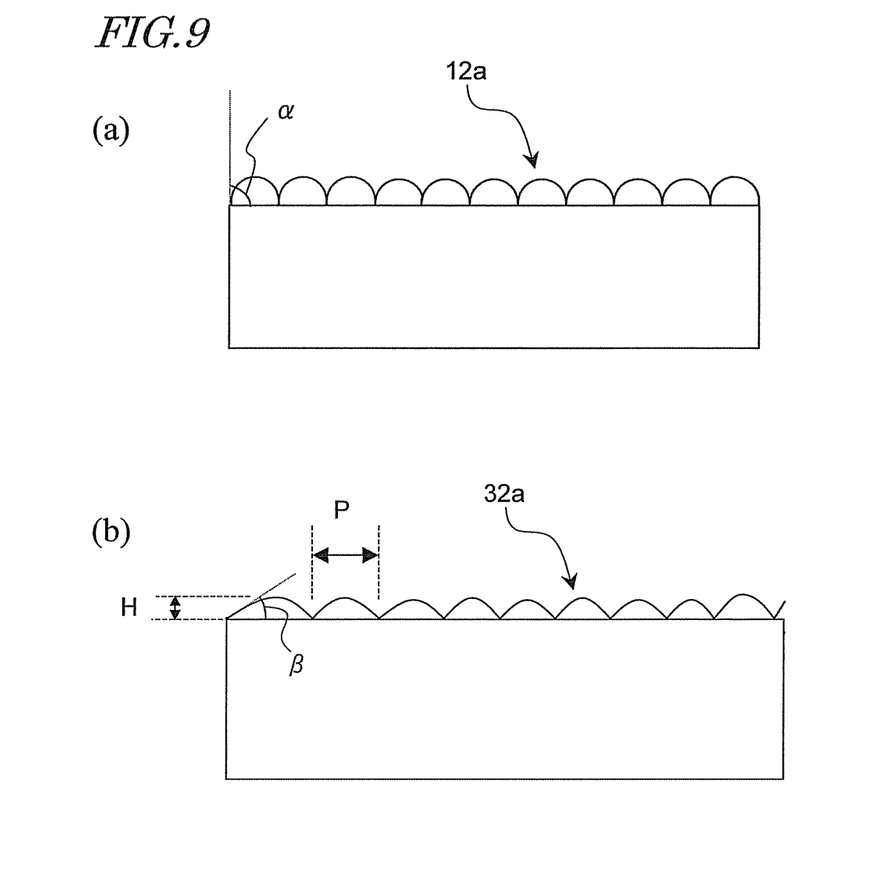
FIGS. 9 (a) and (b) are schematic diagrams illustrating the models used in simulations.

FIG. 9(a) shows a simulated surface which includes raised portions 12a of the antireflection film of the embodiment of the present invention. The elevation angle α of the raised portions 12a was 90°. FIG. 9(b) shows a simulated surface which has a sine wave shape of a typical one of the conventional antiglare layers. The elevation angle β was 15°. The number of light rays was 1,000. The light rays perpendicularly impinged on a subject plane.

Figure 10:
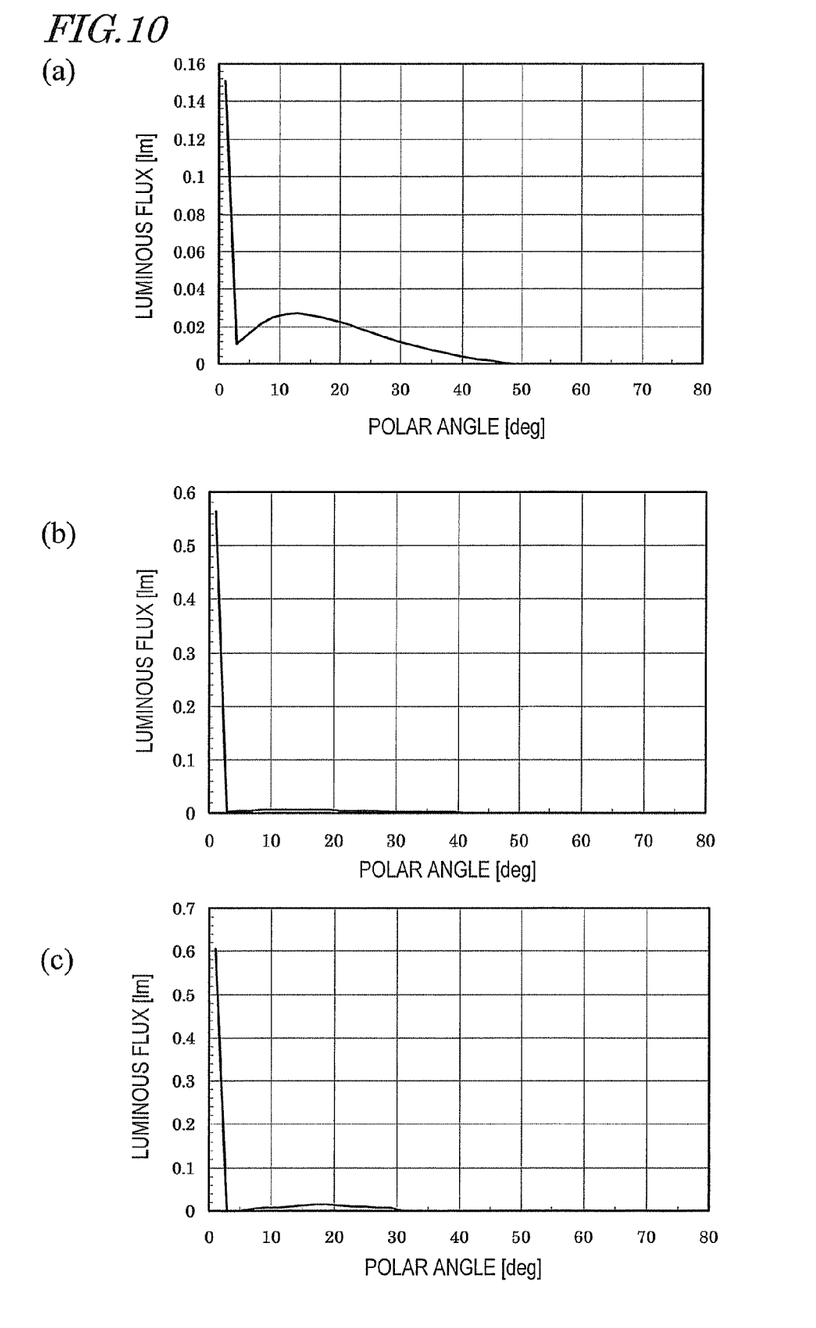
FIGS. 10 (a), (b), and (c) are graphs showing the results of the simulations.

FIGS. 10(a) to 10(c) show the results of the simulations. In the graphs of FIGS. 10(a) to 10(c), the abscissa axis represents the polar angle (the angle from the normal to the plane), and the ordinate axis represents the luminous flux (intensity).

FIG. 10(a) shows the result of the simulation where the semispherical raised portions 12a shown in FIG. 9(a) (height H: 0.1, pitch P: 0.2, aspect ratio: 1:2) are densely arranged. In this case, light from an internal light source is scattered to the extent of a polar angle of about 48°, and the luminous flux itself is high at large polar angle positions. Thus, it is understood that the effect of scattering (diffusion) is large.

FIG. 10(b) shows the result of the simulation where the semispherical raised portions 12a (height H: 0.1, pitch P: 0.4, aspect ratio: 1:4) are sparsely arranged (at the density of about a half of that of FIG. 10(a)). It is also seen in this case that light from an internal light source is scattered to the extent of a polar angle of about 40°.

FIG. 10(c) shows the result of the simulation where the raised portions 32a shown in FIG. 9(b) (height H: 0.05, pitch P: 0.4, aspect ratio: 1:8) are arranged. It is seen in this case that light from an internal light source is scattered only to the extent of a polar angle of about 30° or less.

As apparent from the above, by forming the raised portions 12a which have the elevation angle α of 90° (see FIG. 1), the light coming from the inside of the display panel can be scattered effectively as compared with the conventional antiglare layer. Note that, when the antireflection film is used in a display panel, the size of the raised portions 12a is preferably smaller than the pixel size. In TV applications, the size of the raised portions 12a is preferably 50 μm or less. In mobile applications, the size of the raised portions 12a is preferably 10 μm or less.

As described above, according to the fabrication method of the embodiment of the present invention, a stamper can be obtained which is capable of forming an antireflection film (antireflection surface) that has an antiglare function by a simpler process than the conventional ones. A stamper as fabricated according to the present invention can be used in mass production without any modification. A stamper fabrication method according to the embodiment of the present invention is also suitably used for fabrication of a stamper which has a large surface or a special form (e.g., in the form of a roll).

The antireflection film of the embodiment of the present invention has a configuration where a motheye structure and an antiglare structure are superimposed and has a more excellent antiglare function than conventional ones. Especially, an irregular arrangement of the raised portions that constitute the motheye structure and the antiglare structure can further improve the antiglare effect and the antireflection effect. When an antireflection film of the embodiment of the present invention is applied to a display device, the antiglare effect and the antireflection effect are excellent, and occurrence of diffraction and moiré can be reduced.

INDUSTRIAL APPLICABILITY

The present invention is applicable to various uses of which antireflection is demanded, typically to optical elements for use in display devices or the like.

REFERENCE SIGNS LIST

10 antireflection film
11 base
12 antireflection surface
12a first raised portion (antiglare structure)
12b second raised portion (motheye structure)

The invention claimed is:

1. A method of fabricating a stamper including a surface shape used to form an antireflection-antiglare film with a first surface shape, the surface shape of the stamper being an inversion shape of the first surface shape, the first surface shape including a plurality of first raised portions, each of which has a two-dimensional size of not less than 1 μm and less than 100 μm when seen in a direction normal to the surface, and a plurality of second raised portions, each of which has a two-dimensional size of not less than 10 nm and less than 500 nm when seen in a direction normal to the surface, the plurality of second raised portions being provided on the plurality of first raised portions and between the plurality of first raised portions, and an elevation angle of a surface of the plurality of first raised portions relative to the film surface being about 90° or more, comprising the steps of:
   (a) providing an Al base including at least one element selected from the group consisting of Mn, Mg, and Fe, in which an Al content is 99.0 mass % or less;
   (b) partially anodizing the Al base to form a porous alumina layer having a first plurality of recessed portions;
   (c) bringing the porous alumina layer into contact with an alumina etchant to enlarge the first plurality of recessed portions of the porous alumina layer so that the recessed portions of the first plurality of recessed portions correspond in size to the first raised portions, each of which has a two-dimensional size of not less than 1 μm and less than 100 μm when seen in a direction normal to the surface; and
   (d) performing at least one additional anodizing step and at least one additional etching step thereby forming a second plurality of recessed portions in the porous alumina layer so that the recessed portions of the second plurality of recessed portions correspond in size to the second raised portions, each of which has a two-dimensional size of not less than 10 nm and less than 500 nm when seen in a direction normal to the surface, the recessed portions corresponding in size to the second raised portions being formed in and between the recessed portions corresponding in size to the first raised portions.

2. The method of claim 1, wherein step (c) and step (d) are alternately performed two or more times to form the second plurality of recessed portions in the porous alumina layer corresponding in size to the second raised portions, each recessed portion of the second plurality of recessed portions having a stepped lateral surface.

3. A method of fabricating a stamper comprising the steps of:
   fabricating a preliminary stamper including a surface shape being an inversion shape of the first surface shape by the method according to claim 1, and
   transferring the surface shape of the preliminary stamper to form a metal stamper having the first surface shape.

* * * * *